(12) United States Patent
Hsu et al.

(10) Patent No.: US 11,221,827 B1
(45) Date of Patent: Jan. 11, 2022

(54) IN-MEMORY COMPUTATION DEVICE

(71) Applicant: MACRONIX International Co., Ltd., Hsinchu (TW)

(72) Inventors: Po-Kai Hsu, Tainan (TW); Teng-Hao Yeh, Hsinchu County (TW); Tzu-Hsuan Hsu, Chiayi County (TW); Hang-Ting Lue, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 0 days.

(21) Appl. No.: 17/006,493

(22) Filed: Aug. 28, 2020

(51) Int. Cl.
*G06F 7/544* (2006.01)
*G06G 7/16* (2006.01)
*G06G 7/14* (2006.01)
*G06F 7/501* (2006.01)

(52) U.S. Cl.
CPC ............ *G06F 7/5443* (2013.01); *G06F 7/501* (2013.01); *G06G 7/14* (2013.01); *G06G 7/16* (2013.01)

(58) Field of Classification Search
CPC .... G06G 7/14–164; G06G 7/22; G06F 17/16; G06F 7/5443; G11C 13/00; G11C 11/4094
See application file for complete search history.

(56) References Cited

U.S. PATENT DOCUMENTS

| | | | |
|---|---|---|---|
| 6,198,682 B1 | 3/2001 | Proebsting | |
| 10,496,855 B2 * | 12/2019 | Muralimanohar | .... G06F 7/5443 |
| 10,825,510 B2 * | 11/2020 | Jaiswal | ................ G11C 7/1006 |
| 2017/0228345 A1 * | 8/2017 | Gupta | ................... G06N 3/0635 |
| 2019/0042199 A1 * | 2/2019 | Sumbul | .................... G06N 3/08 |
| 2021/0005230 A1 * | 1/2021 | Wang | ..................... G06G 7/163 |
| 2021/0151106 A1 * | 5/2021 | Wang | ................. G11C 16/0425 |

OTHER PUBLICATIONS

Cheng-Xin Xue et al., "Embedded 1-Mb ReRAM-Based Computing-in-Memory Macro With Multibit Input and Weight for CNN-Based AI Edge Processors," IEEE Journal of Solid-State Circuits, vol. 55, Issue 1, Jan. 2020, pp. 203-215.
Ruiqi Guo et al., "A 5.1pJ/Neuron 127.3us/Inference RNN-based Speech Recognition Processor using 16 Computing-in-Memory SRAM Macros in 65nm CMOS," 2019 Symposium on VLSI Circuits, Jun. 9-14, 2019, Kyoto, Japan, pp. C120-C121.

* cited by examiner

*Primary Examiner* — Matthew D Sandifer
(74) *Attorney, Agent, or Firm* — J.C. Patents (57) ABSTRACT

An in-memory computation device including a memory array, p×q analog to digital converters (ADCs) and a ladder adder is provided. The memory array is divided into p×q memory tiles, where p and q are positive integers larger than 1. Each of the memory tiles has a plurality local bit lines coupled to a global bit line respectively through a plurality of bit line selection switches. The bit line selection switches are turned on or cur off according to a plurality of control signals. The memory array receives a plurality of input signals. The ADCs are respectively coupled to a plurality of global bit lines of the memory tiles. The ADCs respectively convert electrical signals on the global bit lines to generate a plurality of sub-output signals. The ladder adder is coupled to the ADCs, and performs an addition operation on the sub-output signals to generate a calculation result.

15 Claims, 9 Drawing Sheets

IN-MEMORY COMPUTATION DEVICE

BACKGROUND

Technical Field

The invention relates to an in-memory computation device, and particularly relates to an in-memory computation device capable of reducing a data storage demand.

Description of Related Art

In recent years, artificial intelligence (AI) accelerators of deep neural networks (DNN) used for edge computation have become increasingly important for integration and implementation of AI-based Internet of Things (AIoT) applications. In addition to the traditional Von Neumann computation structure, a computation in memory (CIM) framework that may further improve computation efficiency is proposed.

However, in a multiply-add operation of multiple input signals and multiple weights, a large-scale and large amount of data are inevitably generated. Therefore, how to reduce a data storage demand and power consumption required by an in-memory computation device has become an important issue for engineers of the field.

SUMMARY

The invention is directed to an in-memory computation device, which is capable of reducing a data storage demand.

The invention provides an in-memory computation device including a memory array, p×q analog-to-digital converters (ADCs) and a ladder adder. The memory array is divided into p×q memory tiles, where p and q are positive integers larger than 1. Each of the memory tiles has a plurality local bit lines coupled to a global bit line respectively through a plurality of bit line selection switches. The bit line selection switches are turned on or cur off according to a plurality of control signals. The memory array receives a plurality of input signals. The ADCs are respectively coupled to a plurality of global bit lines of the memory tiles. The ADCs respectively convert electrical signals on the global bit lines to generate p×q digital sub-output signals. The ladder adder is coupled to the ADCs, and performs an addition operation on the sub-output signals to generate a calculation result.

Based on the above description, in the invention, the memory array is divided into a plurality of memory tiles, and each of the memory tiles can adjust a turned-on number of the bit line selection switches to adjust a bit number of a weight. The memory tiles respectively generate a plurality of sub-output signals according to the received input signals. Then, the ladder adder is used to perform an addition operation on the sub-output signals to generate the calculation result. Through the above framework, in the in-memory computation device, data storage demand for the multiply-add operation is reduced, which effectively reduces the hardware cost and power consumption, and improves a calculation rate.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
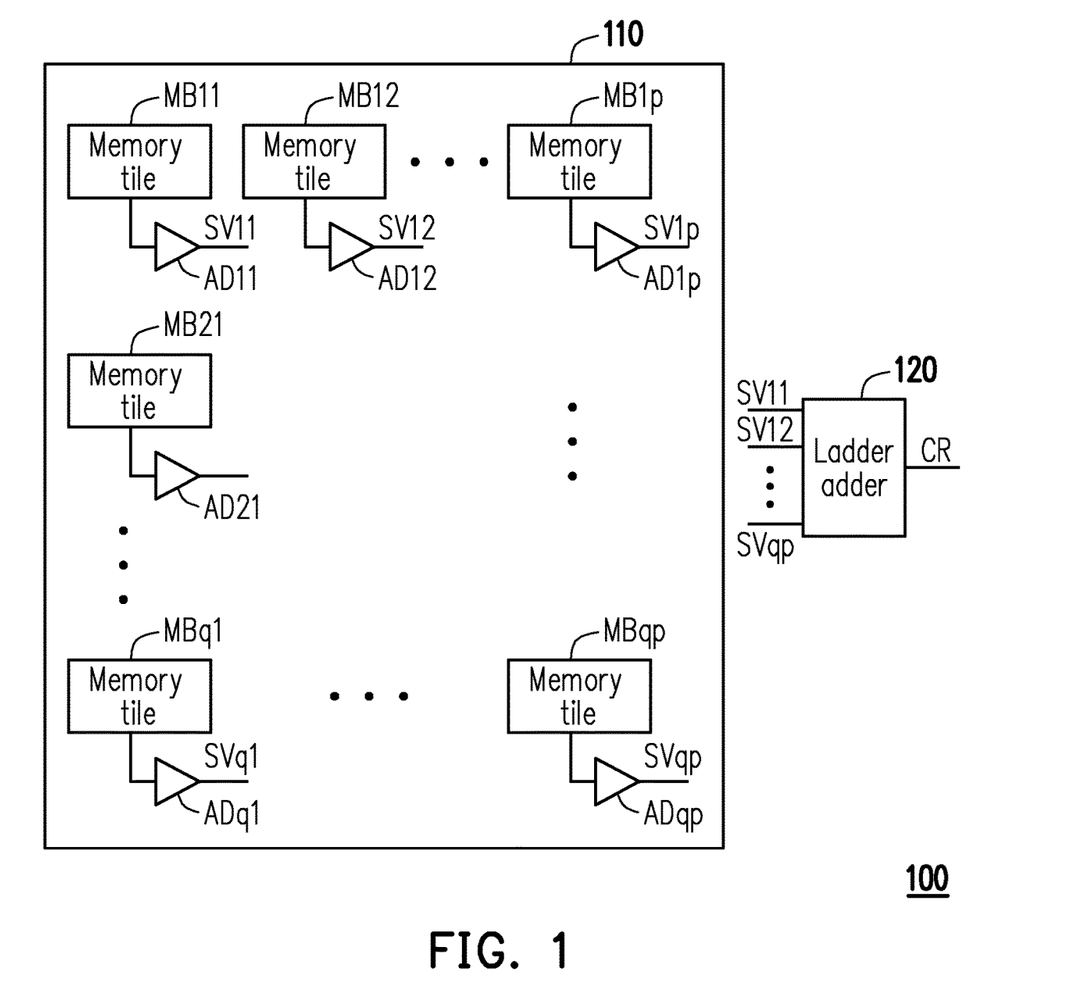
FIG. 1 is a schematic diagram of an in-memory computation device according to an embodiment of the invention.

Referring to FIG. 1, FIG. 1 is a schematic diagram of an in-memory computation device according to an embodiment of the invention. The in-memory computation device 100 may be applied to calculation of deep neural networks (DNN). The in-memory computation device 100 includes a memory array 110, p×q analog-to-digital converters (ADCs) AD11-ADqp, and a ladder adder 120. In the embodiment, the memory array 110 is divided into p×q memory tiles MB11-MBqp, where p and q are positive integers larger than 1. Each of the memory tiles MB11-MBqp may receive a plurality of input signals. A plurality of memory cells in each of the memory tiles MB11-MBqp provide a plurality of weight values, and multiply-add operations are performed according to the input signals and the weight values.

The ADCs AD11-ADqp are respectively coupled to the memory tiles MB11-MBqp. In the embodiment, each of the memory tiles MB11-MBqp has a global bit line. The ADCs AD11-ADqp are respectively coupled to the global bit lines of the memory tiles MB11-MBqp. The ADCs AD11-ADqp respectively perform analog-to-digital conversion operations to electrical signals on the global bit lines to generate p×q sub-output signals SV11-SVqp, where the above electrical signals may be voltage signals or current signals.

In the embodiment, each of the memory tiles MB11-MBqp has a plurality of local bit lines. All of the local bit lines corresponding to the same memory tile are coupled to the corresponding global bit line.

The ladder adder 120 is coupled to the ADCs AD11-ADqp. The ladder adder 120 receives the sub-output signals SV11-SVqp, and performs an addition operation on the sub-output signals SV11-SVqp to generate a calculation result CR.

Figure 2A:
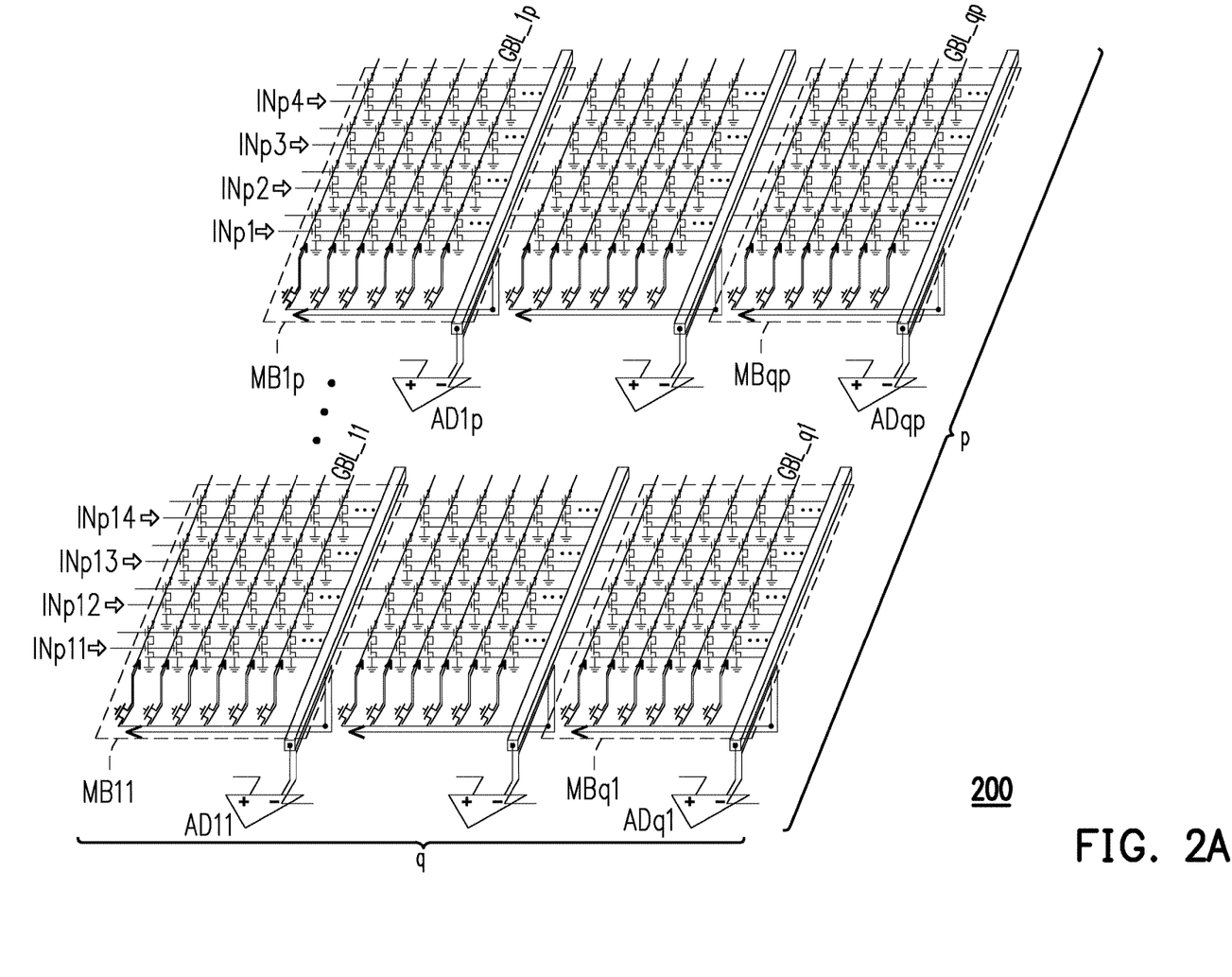
FIG. 2A is a schematic diagram of a dividing manner of a memory array in an in-memory computation device according to an embodiment of the invention.

Referring to FIG. 2A, FIG. 2A is a schematic diagram of a dividing manner of a memory array in an in-memory computation device according to an embodiment of the invention. In the embodiment, the memory array 200 includes a plurality of NOR flash memory cells. The memory array 200 may be divided into p×q memory tiles MB11-MBqp arranged in P memory tile rows and q memory tile columns. p and q are all positive integers larger than 1. The memory tiles MB11-MBqp respectively have a plurality of global bit lines GBL_11-GBL_qp. The memory tiles MB11-MBqp arranged in the same row may receive the same input signals, for example, the memory tiles MB11, MBq1 arranged in the same row receive the input signals IN11-IN14, and the memory tiles MB1p, MBqp arranged in the same row receive the input signals INp1-INp4.

Corresponding to the memory tiles MB11-MBqp, the in-memory computation device of the embodiment of the present invention is provided with p×q ADCs AD11-ADqp. The ADCs AD11-ADqp are respectively coupled to the global bit lines GBL_11-GBL_qp, and perform analog-to-digital conversion operations to the electrical signals on the global bit lines GBL_11-GBL_qp to respectively generate p×q sub-output signals.

The memory cells in the memory array 200 may be pre-programmed to a value of 0 or 1, and by making word line voltages received by the memory cells selected or unselected, the memory cells may provide the required weight values.

It should be noted that in the embodiment of FIG. 2A, if the memory array 200 has j memory cell columns (j-bit weight values may be provided), the maximum weight value provided by the memory array 200 may be up to $2^j-1$, which results in a large data storage demand. Based on the embodiment of the invention, the memory array 200 is divided into p×q memory tiles MB11-MBqp, and by respectively configuring the global bit lines GBL_11-GBL_qp in the memory tiles MB11-MBqp, the maximum weight value provided by each of the memory tiles MB11-MBqp may be up to $q \times (2^{j/q}-1)$ under the premise of providing j-bit weight values, which may effectively reduce the data storage demand.

On the other hand, when the memory array 200 has i memory cell rows (i-bit input signals may be provided), by dividing the memory array 200 into p×q memory tiles MB11-MBqp, the number of input signals corresponding to a single memory tile may be reduced to i/p. Therefore, the maximum value of the input signals corresponding to p memory tiles in the embodiment may be $p \times (2^{i/p}-1)$.

As described above, based on the division of p×q memory tile MB11-MBqp of the embodiment of the invention, the data storage demand of the memory array 200 having i memory cell rows and j memory cell columns may be reduced from $(2^i-1) \times (2^j-1)$ to $p \times q \times (2^{i/p}-1) \times (2^{j/q}-1)$. Taking i=j=8 and p=q=4 as an example, the data storage demand may be reduced from 65025 to 144.

Figure 2B:
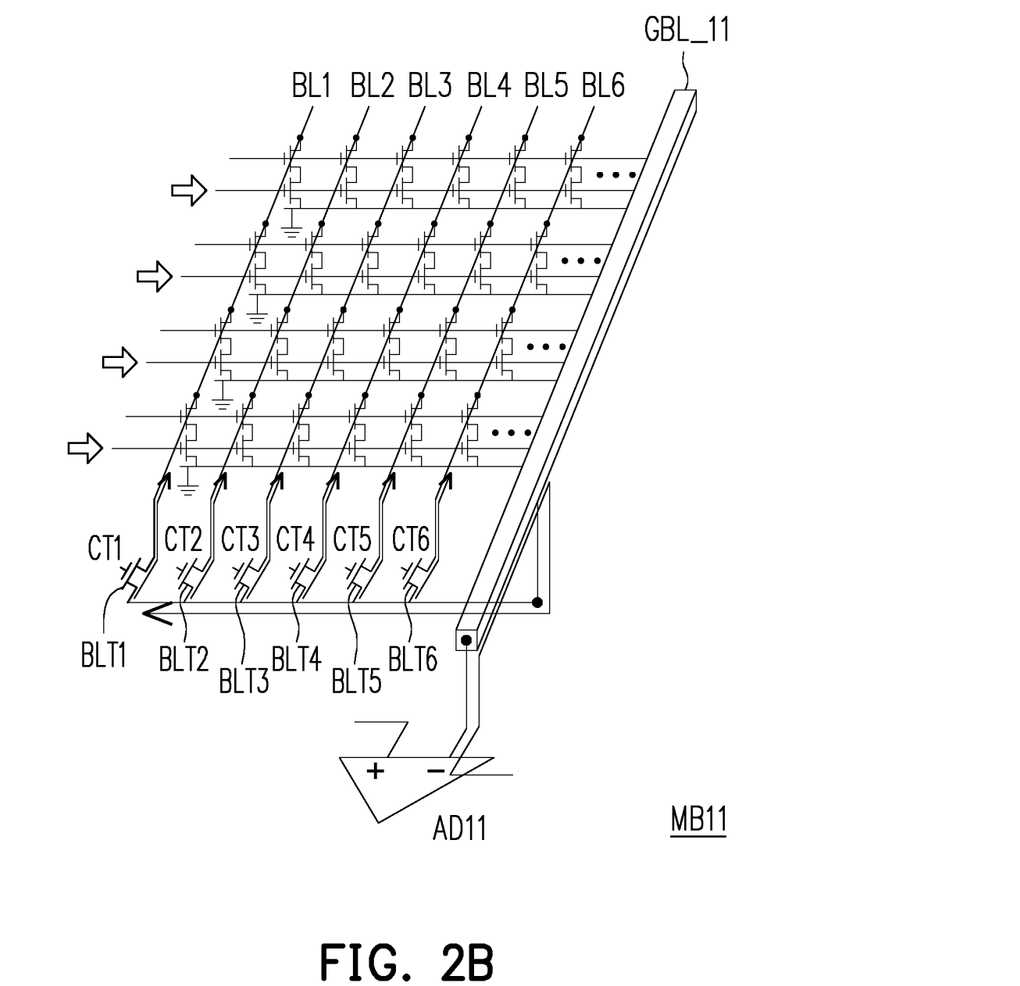
FIG. 2B and FIG. 2C illustrate schematic diagram of an adjusting scheme of bit numbers of a weight according to an embodiment of the invention.
Figure 2C:
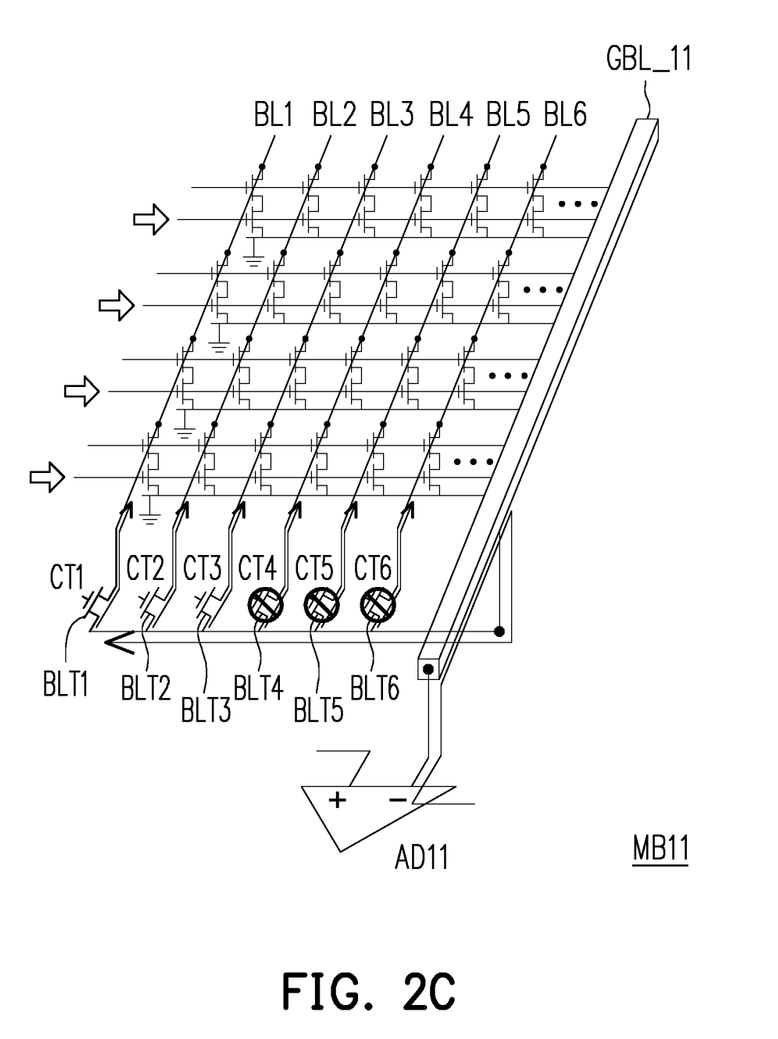

On the other hand, please refer to FIG. 2B and FIG. 2C which illustrate schematic diagram of an adjusting scheme of bit numbers of a weight according to an embodiment of the invention. In FIG. 2B, take the memory tile MB11 as an example. The memory tile MB11 has a plurality of bit line selection switches BLT1~BLT6. A plurality of local bit lines BL1~BL6 are coupled to the global bit line GBL_11 respectively through the bit line selection switches BLT1~BLT6. The bit line selection switches BLT1~BLT6 are respectively controlled by a plurality of control signals CT1~CT6. A turned-on number of the bit line selection switches BLT1~BLT6 can represent a bit number of a weight of the memory tile MB11.

Take FIG. 2C as an example, wherein the bit line selection switches BLT1~BLT3 are turned on according to the control signals CT1~CT3, respectively. And the bit line selection switches BLT4~BLT6 are cut-off according to the control signals CT4~CT6, respectively. In this condition, the three local bit lines BL1~BL3 which are effectively coupled to the global bit line GBL_11 can be used to represent a weight with two bits, and the weight can be encoded to 000, 001, 011 and 111. Of course, if the bit number of the weight needs to be adjusted, the turned-on number of the bit line selection switches BLT1~BLT6 can be adjusted correspondingly.

Figure 3A:
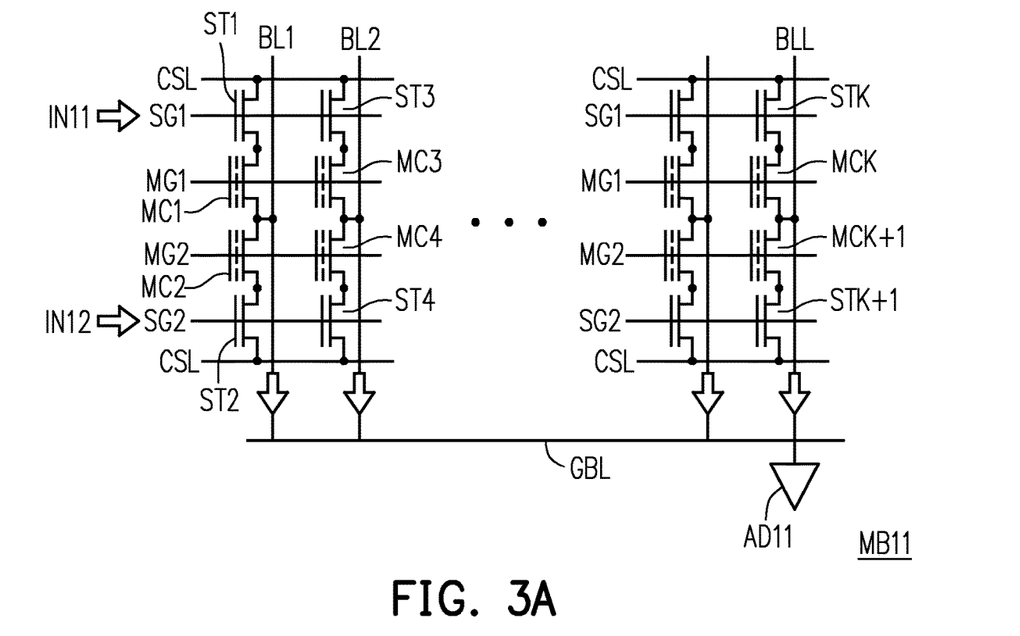
FIG. 3A and FIG. 3B are schematic diagrams of different implementations of a memory tile according to an embodiment of the invention.
Figure 3B:
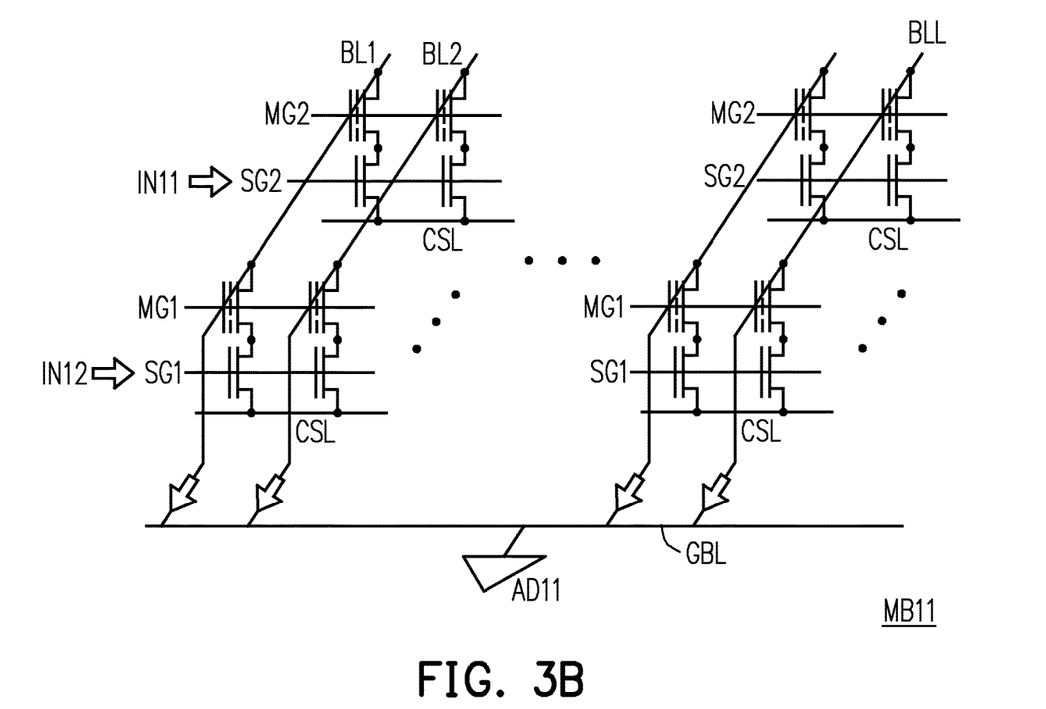

Referring to FIG. 3A and FIG. 3B for implementations of each memory tile, FIG. 3A and FIG. 3B are schematic diagrams of different implementations of a memory tile according to an embodiment of the invention. In FIG. 3A, the memory tile MB11 includes a plurality of memory cells MC1-MCK+1, wherein the memory cells MC1-MCK+1 are 2T NOR flash memory cells. The memory cells MC1-MCK+1 are arranged in a planar manner. The memory tile MB11 further includes a plurality of selection switches ST1-STK+1 respectively corresponding to the memory cells MC1-MCK+1. The selection switches ST1-STK+1 are composed of transistors. The memory cells MC1-MCK+1 and the corresponding selection switches ST1-STK+1 are sequentially connected in series between the corresponding local bit lines and a global source line CSL. Taking the memory cells MC1 and MC2 as an example, the memory cell MC1 and the selection switch ST1 are sequentially connected in series between the local bit line BL1 and the global source line CSL; and the memory cell MC2 and the selection switch ST2 are sequentially connected in series between the local bit line BL1 and the global source line CSL. Moreover, all of the local bit lines BL1-BLL in the memory tile MB11 are coupled to a global bit line GBL.

In the memory tile MB11, control terminals of the selection switches ST1 and ST2 respectively receive the input signals IN11 and IN12. Gates of the memory cells MC1 and MC2 respectively receive signals MG1 and MG2. The memory cells MC1 and MC2 form a NOR flash memory device of a 2T framework. When an in-memory computation operation is performed, the selection switches ST1 and ST2 respectively provide currents according to the input signals IN11 and IN12, and then use transduction values provided by the memory cells MC1 and MC2 as weight values to generate a multiply-add result. The local bit line BL1 may transmit a voltage generated by the multiply-add operation to the global bit line GBL.

In the embodiment, the global bit line GBL is coupled to the ADC AD11. The ADC AD11 may convert the voltage on the global bit line GBL to obtain a sub-output signal in digital format.

It should be noted that the hardware framework of the ADC AD11 may be implemented by an analog-to-digital conversion circuit that is well known by those of ordinary skills in the art, and is not specifically limited.

Moreover, in FIG. 3B, the memory tile MB11 may be implemented by using a three-dimensional framework, and each of the local bit lines BL1-BLL may be coupled to two or more memory cells. The operation mode of the memory tile MB11 in the embodiment of FIG. 3B is the same as that of the memory tile MB11 in FIG. 3A, which is not repeated.

Figure 4:
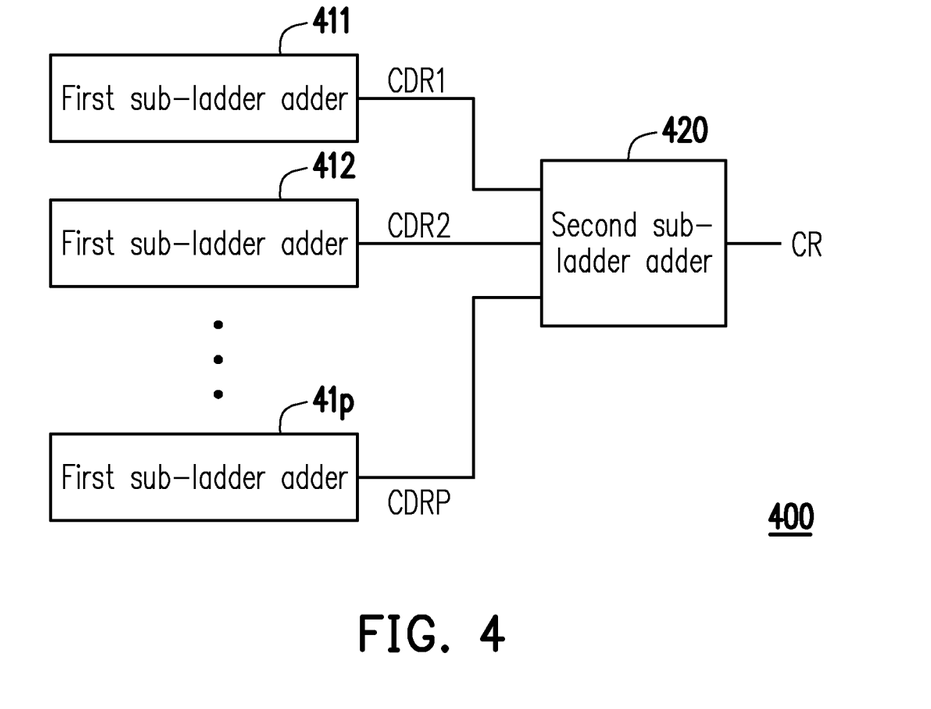
FIG. 4 is a schematic diagram of an implementation of a ladder adder according to an embodiment of the invention.

Referring to FIG. 4, FIG. 4 is a schematic diagram of an implementation of a ladder adder according to an embodiment of the invention. The ladder adder 400 includes a plurality of first sub-ladder adders 411-41p and a second sub-ladder adder 420. Corresponding to the memory array divided into p×q memory tiles, the number of the first sub-ladder adders 411-41p may be p. According to the example of FIG. 2, the first sub-ladder adders 411-41p may respectively correspond to p memory tile rows, and each of the first sub-ladder adder 411-41p is coupled to q ADCs of the corresponding memory tile row. In FIG. 2, taking the memory tile row where the memory tiles MB11-MBq1 are located as an example, the first sub-ladder adder 411 may be coupled to the ADCs AD11-ADq1 respectively corresponding to the memory tiles MB11-MBq1.

The first sub-ladder adder 411 performs an addition operation on the sub-output signals generated by the ADCs AD11-ADq1 to generate a first direction calculation result CDR1. Similarly, the first sub-ladder adders 412-41$p$ may generate a plurality of first direction calculation results CDR2-CDRp through the executed addition operations.

The second sub-ladder adder 420 is coupled to the first sub-ladder adders 411-41$p$. The second sub-ladder adder 420 is used to perform an addition operation on the first direction calculation results CDR1-CDRp respectively generated by the first sub-ladder adders 411-41$p$ to generate the calculation result CR.

Figure 5:
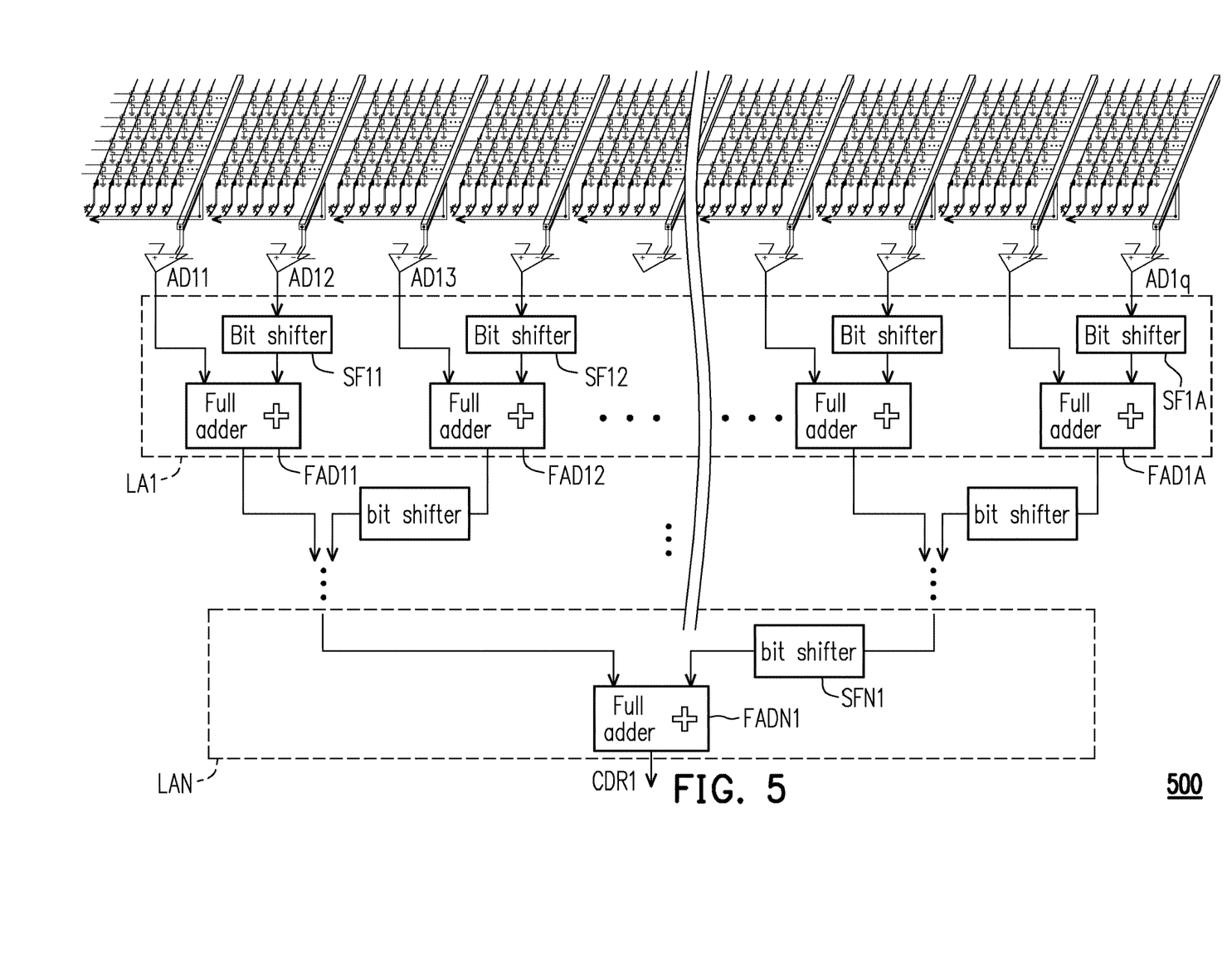
FIG. 5 is a schematic diagram of an implementation of a first sub-ladder adder according to an embodiment of the present invention.
Figure 6:
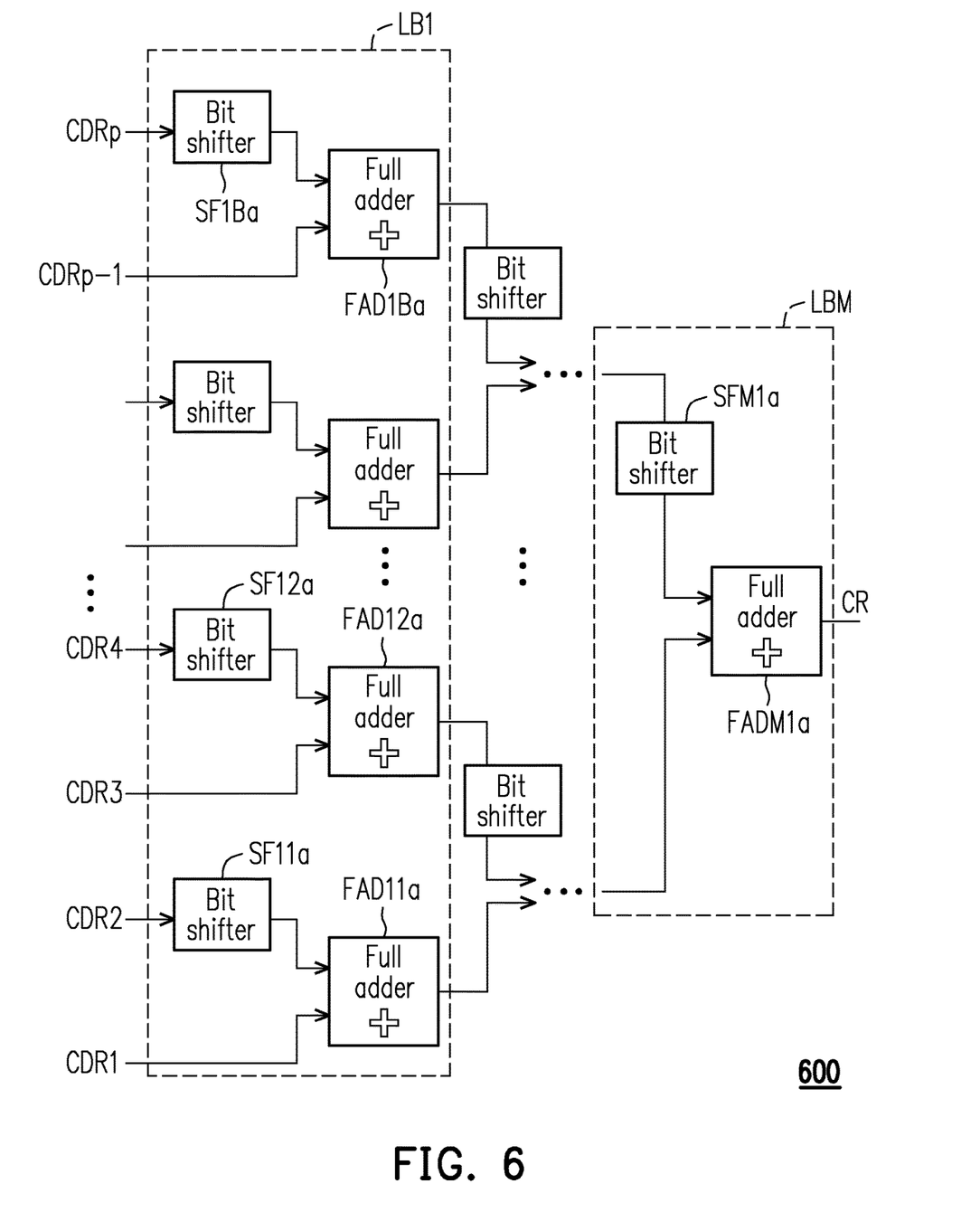
FIG. 6 is a schematic diagram of an implementation of a second sub-ladder adder according to an embodiment of the invention.

Regarding implementation details of each of the first sub-ladder adders 411-41$p$ and the second sub-ladder adder 420, following embodiments of FIG. 5 and FIG. 6 may be referred.

FIG. 5 is a schematic diagram of an implementation of a first sub-ladder adder according to an embodiment of the present invention. A first sub-ladder adder 500 is coupled to q ADCs AD11~AD1$q$ corresponding to the same memory tile row. The first sub-ladder adder 500 has N layers LA1~LAN, where N=log 2$q$. In the embodiment, each of the layers LA1-LAN has one or a plurality of full adders and bit shifters. Where, the first layer LA1 includes full adders FAD11-FAD1A and bit shifters SF11-SF1A. The full adders FAD11-FAD1A respectively correspond to the bit shifters SF11-SF1A, and are arranged in interleaving in pairs and sequentially coupled to the ADCs AD11-AD1$q$. Where, the number of the full adders FAD11-FAD1A is q/2, and the number of the bit shifters SF11-SF1A is also q/2. The full adders FAD11-FAD1A respectively receive the sub-output signals generated by the odd-numbered ADCs AD11, AD13, . . . , and the bit shifters SF11-SF1A respectively receive the sub-output signals generated by the even-numbered ADCs AD12, . . . , AD1$q$, to perform bit-shifting operations.

In the embodiment, the bit shifters SF11-SF1A are used to shift the received sub-output signals to a high-bit direction. In the embodiment, bit shifting numbers of the bit shifters SF11-SF1A of the first layer LA1 are equal to j/q, where j is a total number of the memory cell columns in the memory array. The full adders FAD11-FAD1A respectively receive the outputs of the bit shifters SF11-SF1A, and perform full addition operations.

It should be noted that in the embodiment, bit shifting numbers of the bit shifters of the second layer are equal to 2×j/q, and the others may be deduced by analogy. Moreover, there are q/2$^r$ full adders and q/2$^r$ bit shifters in a $r^{th}$ layer of the first sub-ladder adder 500, and the full adders and the bit shifters in the same layer are sequentially arranged in an interleaving manner, and are respectively coupled to output terminals of the full adders of a previous layer, where 1<r≤N.

The $N^{th}$ layer LAN includes a single full adder FADN1 and a single bit shifter SFN1. A bit shifting number of the bit shifter SFN1 is equal to 2×(log$_2$q−1)×j/q. The full adder FADN1 generates the first direction calculation result CDR1.

The hardware frameworks of the full adders FAD11-FADN1 and the bit shifters SF11-SFN1 in the embodiment may be implemented by full adding circuits and digital shift circuits that are well known to those skilled in the art, and are not specifically limited.

FIG. 6 is a schematic diagram of an implementation of a second sub-ladder adder according to an embodiment of the invention. A second sub-ladder adder 600 includes a plurality of layers LB1-LBM, where each of the layers LB1-LBM includes at least one full adder and at least one bit shifter. The second sub-ladder adder 600 has M layers LB1-LBM, and M=log$_2$p, where p is the number of the first direction calculation results CDR1-CDRp. In the embodiment, the first layer LB1 has full adders FAD11$a$-FAD1B$a$ and bit shifters SF11$a$-SF1B$a$. The full adders FAD11$a$-FAD1B$a$ respectively correspond to the bit shifters SF11$a$-SF1B$a$, and are arranged in interleaving in pairs. A plurality of first input terminals of the full adders FAD11$a$-FAD1B$a$ respectively receive the odd-numbered first direction calculation results CDR1, CDR3 . . . , CDRp-1, and a plurality of second input terminals of the full adders FAD11$a$-FAD1B$a$ are respectively coupled to output terminals of the bit shifters SF11$a$-SF1B$a$. Input terminals of the bit shifters SF11$a$-SF1B$a$ respectively receive the even-numbered first direction calculation results CDR2, CDR4 . . . , CDRp. The number of the full adders FAD11$a$-FAD1B$a$ and the number of the bit shifters SF11$a$-SF1B$a$ are both equal to p/2.

Moreover, in an $s^{th}$ layer of the second sub-ladder adder 600, there are p/2$^s$ full adders and p/2$^s$ bit shifters, and the full adders and the bit shifters in the same layer are sequentially arranged in interleaving, and are respectively coupled to the output terminals of the full adders of the previous layer, where 1<s≤M. In the last layer LBM, there is a single full adder FADM1$a$ and a single bit shifter SFM1$a$. The single full adder FADM1$a$ is used to generate the calculation result CR.

In the embodiment, the bit shifters SF11$a$-SF1B$a$ of the second sub-ladder adder 600 are used to shift the received sub-output signals to the high-bit direction. Bit shifting numbers of the bit shifters SF11$a$-SF1B$a$ in the first layer LB1 are the same, and are equal to i/p, where i is a bit number of the input signal. Moreover, bit shifting numbers of the bit shifters in the second layer of the second sub-ladder adder 600 are all 2×i/p, and the others are deduced by analogy, and a bit shifting number of the bit shifter SFM1$a$ of the last layer LBM may be 2×(log$_2$p−1)×i/p.

The hardware frameworks of the full adders FAD11$a$-FADM1$a$ and the bit shifters SF11$a$-SFM1$a$ in the embodiment may be implemented by full adding circuits and digital shift circuits that are well known to those skilled in the art, and are not specifically limited. Moreover, the hardware framework of the full adders FAD11$a$-FADM1$a$ in the embodiment may be the same as or different from the hardware framework of the full adders FAD11-FADN1 in the embodiment of FIG. 5. The hardware framework of the bit shifters SF11$a$-SFM1$a$ in the embodiment may be the same as or different from the hardware framework of the bit shifters SF11-SFN1 in the embodiment of FIG. 5.

Figure 7:
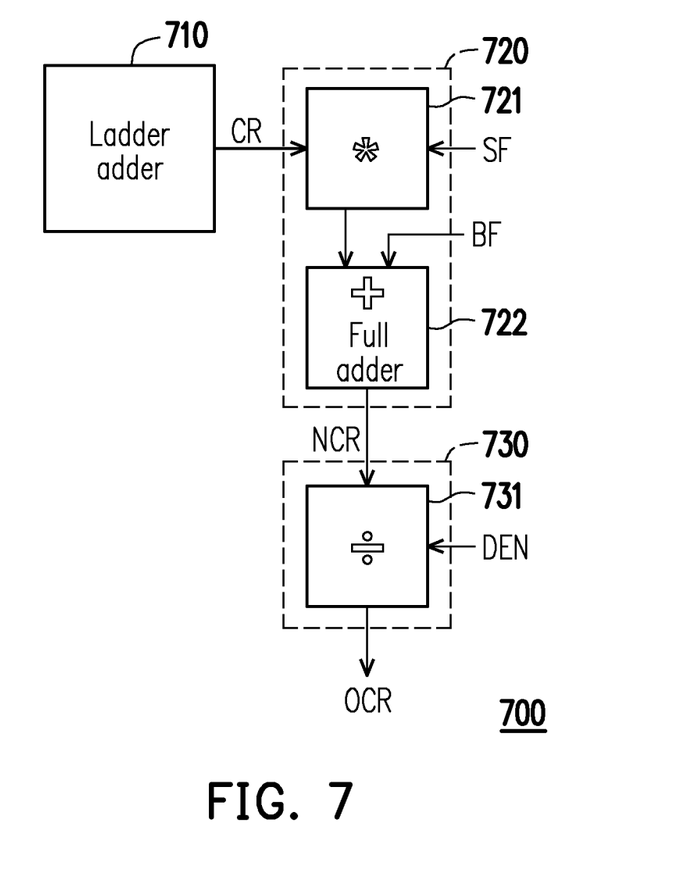
FIG. 7 is a schematic diagram of a part of circuit of an in-memory computation device according to another embodiment of the invention.

Referring to FIG. 7, FIG. 7 is a schematic diagram of a part of circuit of an in-memory computation device according to another embodiment of the invention. An in-memory computation device 700 further includes a normalization circuit 720 and a quantizer 730. The normalization circuit 720 is coupled to an output terminal of a ladder adder 710 to receive the calculation result CR generated by the ladder adder 710. The normalization circuit 720 includes a multiplier 721 and a full adder 722. The multiplier 721 receives the calculation result CR and a scaling factor SF, and multiplies the calculation result CR and the scaling factor SF. The full adder 722 receives an output of the multiplier 721 and additionally receives a bias factor BF. The full adder 722 is used to add the output of the multiplier 721 and the bias factor BF to generate an adjusted calculation result NCR.

The above-mentioned scaling factor SF and the bias factor BF may be set by a designer to normalize the calculation result CR to a reasonable value range to facilitate subsequent calculations.

The quantizer 730 is coupled to the normalization circuit 720 to receive the adjusted calculation result NCR, and divides the adjusted calculation result NCR by a reference value DEN to generate an output calculation result OCR. In the embodiment, the quantizer 730 may be a divider 731. The reference value DEN may be a non-zero preset value preset by the designer, which is not specifically limited.

The hardware frameworks of the above-mentioned full adder 722, the multiplier 721, and the divider 731 may be implemented by a full adding circuit, a multiplier circuit, and a divider circuit well known in the art, which are not specifically limited.

It should be noted that the in-memory computation device 700 of the embodiment may be applied to a convolutional neural network (CNN).

In summary, in the invention, by dividing the memory array into p×q memory tiles, the ladder adder is used to complete the required multiply-add operation. Under the framework of the invention, a bit number of a weight can be adjusted according to a turned-on number of the bit line selection switches. Also, a magnitude of values generated during the calculation process may be reduced, so as to effectively reduce the data storage demand, reduce a hardware burden and increase calculation efficiency.

What is claimed is:

1. An in-memory computation device, comprising:
    a memory array, divided into p×q memory tiles, wherein p and q are positive integers larger than 1, and the memory array receives a plurality of input signals, each memory tile is respectively coupled to one of a plurality of global bit lines, where each of the memory tiles has a plurality of local bit lines coupled to a corresponding global bit line through a plurality of bit line selection switches, and the bit line selection switches are respectively controlled by a plurality of control signals to be turned on or cut off;
    p×q analog-to-digital converters, respectively coupled to the global bit lines of the memory tiles, and respectively converting electrical signals on the global bit lines to generate p×q digital sub-output signals; and
    a ladder adder, coupled to the analog-to-digital converters, and performing an addition operation on the sub-output signals to generate a calculation result.

2. The in-memory computation device as claimed in claim 1, wherein a turn on number of the bit line selection switches of each of the memory tiles represents a bit number of a weight.

3. The in-memory computation device as claimed in claim 1, wherein the ladder adder comprises:
    p first sub-ladder adders, each of the first sub-ladder adders being respectively coupled to q of the analog-to-digital converters, and the first sub-ladder adders respectively generating p first direction calculation results; and
    a second sub-ladder adder, coupled to the first sub-ladder adders, and generating the calculation result according to the first direction calculation results.

4. The in-memory computation device as claimed in claim 3, wherein each of the first sub-ladder adders has N layers, and each layer comprises at least one full adder and at least one bit shifter, wherein $N=\log_2 q$.

5. The in-memory computation device as claimed in claim 4, wherein a first layer of each of the first sub-ladder adders has q/2 of the at least one full adder and q/2 of the at least one bit shifter, and the at least one full adder and the at least one bit shifter are sequentially arranged in interleaving to respectively receive the corresponding sub-output signals.

6. The in-memory computation device as claimed in claim 5, wherein a $r^{th}$ layer of each of the first sub-ladder adders has $q/2^r$ of the at least one full adder and $q/2^r$ of the at least one bit shifter, and the at least one full adder and the at least one bit shifter in the same layer are sequentially arranged in interleaving, and are respectively coupled to an output terminal of the at least one full adder of a previous layer, wherein $1<r\leq N$.

7. The in-memory computation device as claimed in claim 3, wherein the second sub-ladder adder has M layers, and each layer comprises at least one full adder and at least one bit shifter, wherein $M=\log_2 p$, and the at least one full adder and the at least one bit shifter are arranged in interleaving to respectively receive the first direction calculation results.

8. The in-memory computation device as claimed in claim 7, wherein a first layer of the second sub-ladder adder has p/2 of the at least one full adder and p/2 of the at least one bit shifter, and the at least one full adder and the at least one bit shifter are sequentially arranged in interleaving to respectively receive the first direction calculation results.

9. The in-memory computation device as claimed in claim 7, wherein an $s^{th}$ layer of the second sub-ladder adder has $p/2^s$ of the at least one full adder and $p/2^s$ of the at least one bit shifter, and the at least one full adder and the at least one bit shifter in the same layer are sequentially arranged in interleaving, and are respectively coupled to an output terminal of the at least one full adder of a previous layer, wherein $1<s\leq M$.

10. The in-memory computation device as claimed in claim 1, further comprising:
    a normalization circuit, coupled to the ladder adder, and performing a normalization operation on the calculation result according to a scaling factor and a bias factor to generate an adjusted calculation result.

11. The in-memory computation device as claimed in claim 10, further comprising:
    a quantizer, coupled to the normalization circuit, and performing a quantization operation on the adjusted calculation result according to a reference value to generate an output calculation result.

12. The in-memory computation device as claimed in claim 11, wherein the quantizer is a divider, and the divider divides the adjusted calculation result by the reference value to generate the output calculation result.

13. The in-memory computation device as claimed in claim 10, wherein the normalization circuit comprises:
    a multiplier, multiplying the calculation result and the scaling factor; and
    a full adder, adding an output of the multiplier and the bias factor to generate the adjusted calculation result.

14. The in-memory computation device as claimed in claim 1, wherein the memory array comprises a plurality of 2T NOR flash memory cells.

15. The in-memory computation device as claimed in claim 1, wherein a control terminal of a selection transistor corresponding to each of the 2T NOR flash memory cell receives one of the input signals.

* * * * *